United States Patent Office 3,714,038
Patented Jan. 30, 1973

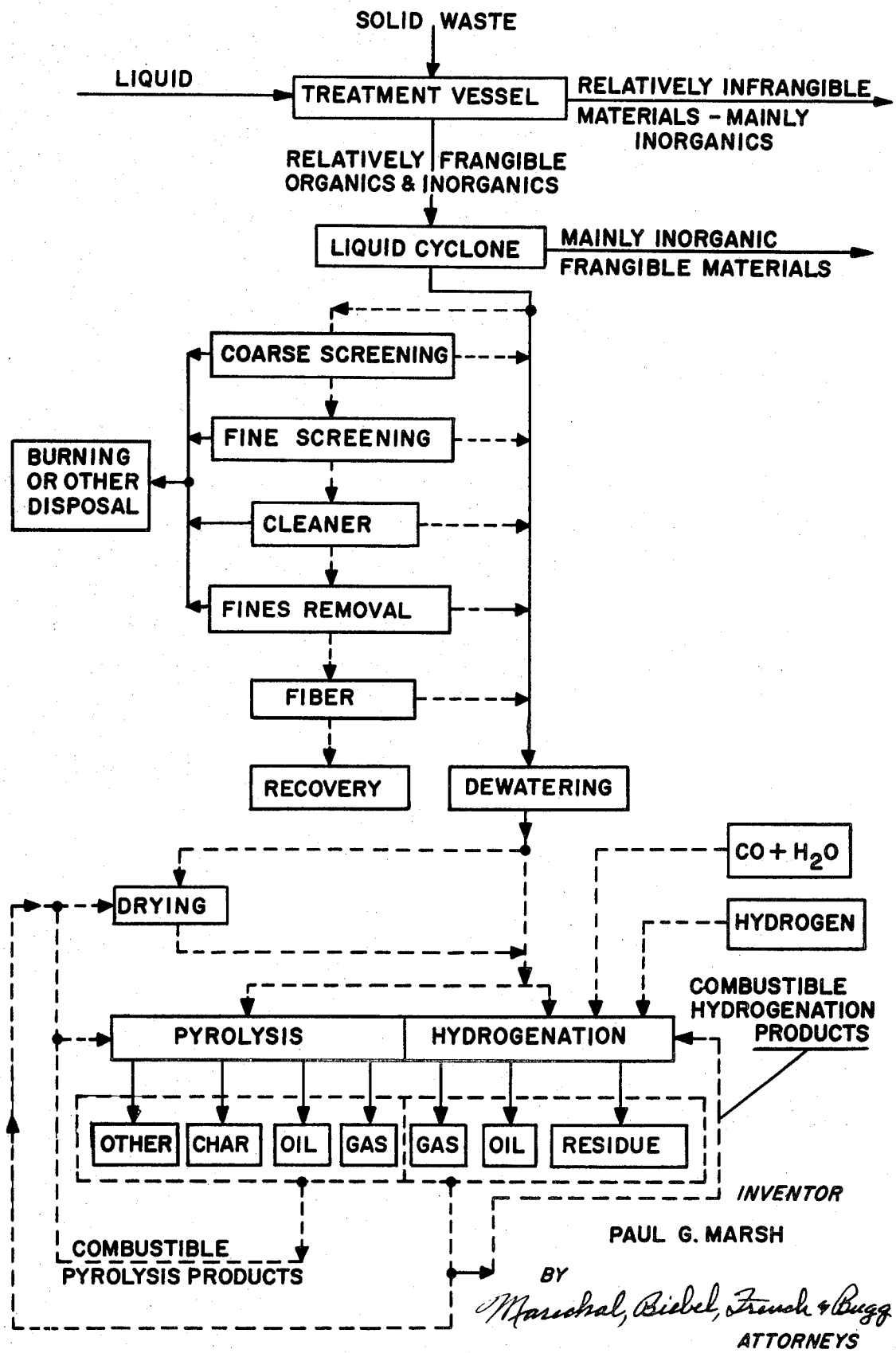

3,714,038
PROCESS AND PRODUCT FOR CONVERTING ORGANIC MATERIALS BY PYROLYSIS OR HYDROGENATION
Paul G. Marsh, Hamilton, Ohio, assignor to The Black Clawson Company, Hamilton, Ohio
Filed Dec. 18, 1970, Ser. No. 99,554
Int. Cl. B01d 17/00
U.S. Cl. 210—59
12 Claims

ABSTRACT OF THE DISCLOSURE

A process for chemically changing solid waste materials to obtain valuable organic products therefrom consists of pulping a mixture of organic and inorganic wastes in a liquid such as water to form a slurry, removing inorganics from the slurry, dewatering the resulting slurry of organics and either pyrolyzing or hydrogenating the dewatered slurry. Additionally, if it is desired to sort the organics by types or by specific materials for separate pyrolysis or hydrogenation, this may be done by one or more screening, classifying or separating steps intermediate the pulping and pyrolysis or hydrogenation steps.

CROSS-REFERENCE TO RELATED APPLICATION

Reference is made to my copending application Ser. No. 94,084, filed Dec. 1, 1970, titled Waste Treatment and Fiber Reclamation System.

The inventions disclosed in my above application are concerned primarily with the recovery of reusable papermaking fiber from municipal waste. The present invention is directed to another approach to the conversion of municipal waste into valuable by-products.

BACKGROUND OF THE INVENTION

Pyrolysis and hydrogenation processes are known for chemically converting organic materials to other, useful chemical products. For example, cellulosic products such as wood and high carbon materials such as coal have been pyrolyzed in the past to obtain such materials as gas, oil and char. Aside from the pyrolysis or hydrogenation of raw materials such as wood and coal, which have value in their unconverted state, some consideration has been given more recently to chemically converting solid organic wastes. For example, in a paper entitled "Pyrolysis, Hydrogenation and Incineration of Municipal Refuse—A Progress Report" by Richard C. Corey, research director, Pittsburgh Coal Research Center, Bureau of Mines, 4800 Forbes Ave., Pittsburgh, Pa., presented at the Proceedings of the Second Mineral Waste Utilization Symposium, jointly sponsored by the United States Bureau of Mines and IIT Research Institute, in Chicago, Ill. on Mar. 18–19, 1970, experiments are described in which solid organic wastes were treated by pyrolysis and hydrogenation.

A difficulty encountered in attempting to pyrolyze or hydrogenate solid wastes, however, has been that such wastes ordinarily contain a high proportion of materials that are neither pyrolyzable nor convertible by hydrogenation. The Solid Waste Disposal Act, Title 18 USCA, chapter 39, defines "solid wastes" as a combination of garbage, refuse and other discarded solid materials. Typical solid wastes, therefore, will contain such things as glass, metals, stone and ceramics in addition to organics such as food wastes, plastics and paper, the latter, organic constitutents of course being amenable to pyrolysis and hydrogenation while the former, inorganics are not.

This problem was avoided in prior experiments involving pyrolysis or hydrogenation of solid wastes by using wastes which contained little or no inorganics such as glass and metal. In one example, the waste treated was an aerobically digested humus. The humus had been converted from organic household refuse, the householders in this case having been required to separate their glass and metallic refuse from food wastes, paper, plastic and rags. In another example the material treated was the plastics removed from the above noted humus, while in another, the wastes shipped to the laboratory had metallics removed prior to shipment.

It will be seen therefore, that while there has been some speculation regarding pyrolysis or hydrogenation of solid wastes, solid wastes in the accepted sense of the term contain unacceptable components which previously have required removal by manual sorting or the like. Since most communities do not require householders to sort refuse and since manual sorting by the collector is generally impractical, commercial application of pyrolysis or hydrogenation techniques to heterogeneous solid wastes has not been attained.

SUMMARY OF THE INVENTION

Valuable organic products are obtained by pyrolysis or hydrogenation in accordance with the present invention by utilizing a process which first produces from solid wastes such as municipal or industrial wastes a raw material ideally suited for pyrolysis or hydrogenation. This is accomplished by mixing solid wastes with a liquid medium and then subjecting the resulting mixture to shear forces of sufficient intensity to reduce relatively frangible portions thereof to at least some predetermined particulate size. The resulting slurry of reduced solids and liquid is then extracted from the treatment vessel, inorganic solids separated from the slurry, a substantial portion of the free liquid of the slurry removed, and the resulting, deliquefied material heated in the absence of gaseous oxygen, in the case of pyrolysis or, in the case of hydrogenation, heated under pressure in the presence of either hydrogen or carbon monoxide and water.

The solid wastes being treated will include not only organic materials such as a synthetic resinous materials and paper, but also inorganics, such as glass, metal, ceramics, etc. The process in accordance with the present invention, therefore, contemplates the removal of these inorganics prior to dewatering and either pyrolysis or hydrogenation of the remaining organic components. This is done by removing relatively infrangible solids from the treatment vessel separately from the slurry and separating relatively frangible inorganics from the slurry after the slurry has been directed from the vessel.

It will be seen, therefore, that the present invention provides a process of converting solid waste materials to useful and valuable chemical compounds and also a product which is particularly suited for conversion to such compounds by either pyrolysis or hydrogenation.

BRIEF DESCRIPTION OF THE DRAWING

The single figure shows the process steps involved in practicing the present invention, including several alternate steps.

DESCRIPTION OF THE PREFERRED EMBODIMENTS

For purposes of illustration, the system of the present invention will be described in conjunction with the treatment of solid wastes of the class typified by the municipal wastes normally collected from individual households.

Such wastes may comprise approximately 75% solids and 25% moisture and include such dissimilar components as:

| | Percent |
|---|---|
| Metal | 8 |
| Glass and ceramics | 10 |
| Dirt | 2 |
| Wood | 1 |
| Grass | 2.5 |
| Plastics | 2.0 |
| Textiles | 1.0 |
| Leather, plastic and rubber | 2.0 |
| Garbage | 5.8 |
| Paper | 40 |

This heterogeneous material is deposited in a treatment vessel 10, preferably with water or some other liquid, and subjected to shear forces of sufficient intensity to reduce the relatively frangible portions of the wastes to some predetermined particulate size or smaller. In this regard reference may be had to application Ser. No. 861,778, field Sept. 29, 1969, now Patent No. 3,595,488, for a treatment vessel suited for the reduction of wastes of this type and from which the reduced, frangible portions of the solid wastes may be continuously withdrawn through a perforate extraction plate for further treatment in the system. The size of the perforations in the extraction plate determine the maximum particle size of the slurry withdrawn from the treatment vessel 10, which is preferably of the order of one inch in diameter as disclosed in application Ser. No. 94,084. As noted in Pat. No. 3,595,488, the consistency of the mixture within vessel 10 may be as high as 10%, depending upon the amount of inorganics in the charge, but the consistency of the withdrawn slurry will be in the range of 2–6% solids, as is proper for treatment in a liquid cyclone.

With the type of treatment vessel shown in Pat. No. 3,595,488, relatively infrangible materials, consisting mainly of inorganics such as metals, may be withdrawn separately from the treatment vessel and disposed of through salvage or other appropriate methods. It should also be noted that, although the drawing shows a liquid being added to the treatment vessel separately, it will preferably be added in a countercurrent flow through the apparatus removing the relatively infrangible materials, both to wash the infrangibles and to prevent the escape of fibers, aluminum, etc., until they have reduced sufficiently to be removed through the perforated bed plate.

Regardless of the specific treatment vessel used, the relatively frangible materials, including both organics and inorganics, may then be separated centrifugally by a liquid cyclone 11 or the like into a mainly organic fraction and a mainly inorganic fraction. The inorganic fraction, consisting of such materials as glass, ceramics, stone, dirt, etc., may either be subjected to appropriate salvage operations for recovery of the valuable components thereof or disposed of by some other method, such as land fill. The organic materials from the liquid cyclone will typically include the following:

| Material | Formula | Percent Carbon | Percent Oxygen |
|---|---|---|---|
| Cellulose | $C_6H_{10}O_5$ | 44 | 49 |
| Polyethylene | $C_8H_{10}$ | 86 | 0 |
| Polypropylene | $C_8H_{16}$ | 86 | 0 |
| Polystyrene | $C_{16}H_{16}$ | 92 | 0 |
| Polyvinyl chloride | $C_4H_6Cl_2$ | 38 | 0 |

Regardless of the specific organic components remaining, it will be seen that at this point essentially all of the inorganic material such as glass, metal and ceramics, which would inhibit pyrolysis or hydrogenation and tend to result in stoppages in the system, have been removed. At this point then, the remaining organics may be treated in various alternate ways prior to subjection to pyrolysis or hydrogenation. Thus, it may be desirable to separate the plastic-rich residues of the organics from the cellulose components, which in the present illustration may comprise in excess of 72% of the total organics.

Reasons for separating cellulosic and plastic components are: the cellulose may be recovered for resale as papermaking fibers, and the plastic material can be more efficiently treated by either pyrolysis or hydrogenation after the cellulose has been removed. This results because the plastics contain less oxygen atoms, which reduce the yield through inefficient reaction, and the percentage of carbon in the organic portion on the whole is substantially increased through the removal of the cellulosic portion of the organics. Additionally, removal of the fiber results in a more homogeneous mix which is better suited for hydrogenation.

It may be desirable, therefore, to divert the organic material coming from the liquid cyclone through one or more treatment stages to separate in varying percentages the plastic and cellulosic components of the organic materials coming from the liquid cyclone. Thus, material may be subjected to only a coarse screen 12 to screen out larger particles and the screen rejects returned to the system for further treatment, while the accepts may be burned or otherwise disposed of or passed on for further screening treatment. Alternatively the accepts from the coarse screen may be passed on to a fine screen 13, a cleaner 14, and a fines removal apparatus 15, with the rejects from each of these operations returned to the system for treatment by pyrolysis or hydrogenation. The accepts from these operations can, of course, be delivered to an incinerator or some other disposal apparatus or passed downstream to a fiber selector 16 for further classification of the cellulosic components of the organics into fibers of varying length with only the longer fibers being transmitted to a recovery unit 17, for salvage, the finer material being recirculated through the system for pyrolysis or hydrogenation with the other organic components.

My above application Ser. No. 94,084 discloses in detail a system for performing the various steps represented in the present drawing, inclding recommended apparatus for use at each stage and recommended particle sizes to be established in the course of each step. More specifically, with the perforations in the extraction plate of the treatment vessel 10 sized to pass particles of a maximum size of the order of one inch in diameter, the screens 12 and 13 are described as having perforations .125 and .0625 inch in diameter. Accordingly, the slurry to be subjected to pyrolysis or hydrogenation in accordance with the invention will be a homogeneous mixture characterized by a maximum particle size established by the perforations in the extraction plate of the treatment vessel 10, which is therefore of the order of one inch in its longest dimension, and by a uniform distribution of particle sizes ranging down to as small as the reject from the fines remover.

It will generally be desirable to incorporate in the system, upstream of either the pyrolysis or hydrogenation unit, means for dewatering the slurry of liquid and organic materials. The dewatering equipment 20 may take a variety of forms, such as a screw thickener or any other apparatus capable of reducing substantially the liquid content of the slurry of organics at this point in the system.

From the dewatering device 20, the slurry of organics may then be passed into either a pyrolysis unit 21 or a hydrogenation unit 22. If treated by pyrolysis, the materials may be heated in a known manner in substantial absence of oxygen to cause the organics to be broken down into such constituents as gas, oil, char, grease, wax and other organic and inorganic materials, etc., depending upon the specific process conditions. In this regard it will be noted that a portion, or in some cases, even all of the combustible products from the pyrolysis reaction may be returned to the pyrolysis unit for heating purposes to decrease or eliminate the need for external heating. Additionally, regardless of whether the combustible products are reused in the pyrolysis reaction or used for fuel purposes generally, their low sulfur content makes them especially attractive since their combustion does not produce air polluting sulfur dioxide.

If the organics are to be hydrogenated, they will be treated under temperature and high pressure with either hydrogen or a combination of carbon monoxide and water. The resulting products from this process are gas, oil and various residues. As in the case of the pyrolysis operation, some or all of the combustible products of hydrogenation may be returned to the system for heating to render it totally or partially self-sustaining or they may be used as fuels generally.

It will be noted from the drawing that in some instances it may also be desirable to dry the organic products coming from the dewatering steps. Thus in the case of pyrolysis, experimentation has shown a marked increase in the yield of valuable by-products from the pyrolysis operation when the moisture content of material being treated is decreased. On the other hand, it will usually be desirable to control carefully the moisture content of the products being subjected to hydrogenation when the carbon monoxide and water combination is being utilized in the hydrogenation process to permit a more precise control of the inter-reacting elements. In this regard it will be noted that some or all of the combustible products of either pyrolysis or hydrogenation may be recycled and burned for drying.

It will be seen that by the process of the present invention a product is derived which is ideally suited for treatment by either pyrolysis and/or hydrogenation to produce therefrom useful products, such as oil, gas, grease, wax, various chemical compounds, and char, which may be converted to activated carbon.

While the method and product hereindescribed constitute preferred embodiments of the invention, it is to be understood that the invention is not limited to this precise method and product, and that changes may be made therein without departing from the scope of the invention.

What is claimed is:
1. A process of converting solid waste material comprising:
   (a) depositing solid waste materials including relatively frangible and infrangible organic and inorganic solids and a liquid medium in a treatment vessel,
   (b) subjecting said solids in the presence of said liquid medium in said treatment vessel to forces of sufficient intensity to reduce said relatively frangible organic and inorganic solids to particles of a predetermined size range,
   (c) removing from said treatment vessel in slurry form a portion of said liquid medium and such of said organic and inorganic particles as pass through perforations of the order of one inch in diameter,
   (d) removing from said treatment vessel separately from said slurry said relatively infrangible solids,
   (e) removing from said slurry of said liquid medium and said relatively frangible inorganic and organic solids the inorganic constituents thereof,
   (f) removing from the resulting slurry of said organic solids and liquid medium a substantial portion of said liquid medium, and
   (g) chemically changing the organic material remaining after deliquefication of said slurry of organics by heating said organic materials in the substantial absence of gaseous oxygen.

2. The process of claim 1 wherein said deliquefication step comprises:
   (a) mechanically removing a substantial portion of said liquid from said slurry to provide a high consistency fraction thereof, and
   (b) drying said fraction prior to said chemical changing thereof.

3. The process of claim 2 further comprising:
   (a) utilizing at least some of the products resulting from said chemical changing step as fuel for said drying of said fraction.

4. The process of claim 1 wherein said organic materials include cellulosic and synthetic resinous components and comprising the step of:
   (a) dividing said organics into said components for separate treatment thereof.

5. The process of claim 4 wherein said separate treatment comprises:
   (a) recovering said cellulosic components from said organic materials, and
   (b) chemically changing only said synthetic resinous components.

6. The process of claim 4 wherein said separate treatment comprises:
   (a) chemically changing each of said components separately from the other.

7. The process of claim 1 further comprising:
   (a) utilizing at least some of the products of said chemical changing step as fuel to provide heat for said chemical changing step.

8. The process of claim 1 wherein said step of chemically changing said organic materials comprises:
   (a) subjecting said organic materials to pyrolysis.

9. The process of claim 1 wherein said step of chemically changing said organic materials comprises:
   (a) subjecting said organic materials to hydrogenation.

10. The process of claim 9 wherein said hydrogenation step comprises:
    (a) heating said organic materials in the presence of hydrogen at pressures substantially in excess of atmospheric.

11. The process of claim 10 wherein said step of chemically changing said organic materials comprises:
    (a) heating said organic materials in the presence of carbon monoxide and water.

12. A mass of organic particles having an average particle size falling within a preselected range of values and prepared from a process consisting of:
    (a) depositing solid waste materials including relatively frangible and infrangible organic and inorganic solids and a liquid medium in a treatment vessel,
    (b) subjecting said solids in the presence of said liquid medium in said treatment vessel to forces of sufficient intensity to reduce said relatively frangible organic and inorganic solids to particles of a predetermined size forming a mixture with said liquid medium,
    (c) removing from said treatment vessel in slurry form a portion of said liquid medium and such of said organic and inorganic particles as pass through perforations of the order of one inch in diameter,
    (d) removing from said treatment vessel separately from said slurry said relatively infrangible solids,
    (e) removing from said slurry of the inorganic constituents thereof,
    (f) removing from the resulting slurry of said organic solids and liquid medium a substantial portion of said liquid medium, and
    (g) chemically changing the organic material remaining after deliquefication of said slurry of organics by heating said organic materials in the substantial absence of gaseous oxygen.

References Cited
UNITED STATES PATENTS

| | | | |
|---|---|---|---|
| 3,391,661 | 7/1968 | Lee | 110—8 |
| 2,238,367 | 4/1941 | Mohr et al. | 201—21 X |

MICHAEL ROGERS, Primary Examiner

U.S. Cl. X.R.

110—8; 201—21; 210—71